US009009965B2

(12) United States Patent
Tragesser et al.

(10) Patent No.: US 9,009,965 B2
(45) Date of Patent: Apr. 21, 2015

(54) METHOD TO CENTER LOCATE CUTTER TEETH ON SHROUDED TURBINE BLADES

(75) Inventors: Daniel Tragesser, Greenville, SC (US); Ian Reeves, Piedmont, SC (US); Christopher Thompson, Danvers, MA (US); Todd Moran, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 2281 days.

(21) Appl. No.: 11/805,528

(22) Filed: May 24, 2007

(65) Prior Publication Data

US 2008/0292466 A1 Nov. 27, 2008

(51) Int. Cl.
*B23P 6/00* (2006.01)
*F01D 5/22* (2006.01)

(52) U.S. Cl.
CPC .......... *F01D 5/225* (2013.01); *F05D 2230/238* (2013.01); *F05D 2230/232* (2013.01)

(58) Field of Classification Search
USPC ..................... 29/889.1, 889.2, 889.21, 889.7; 415/173.4, 173.6, 174.4; 416/191, 192
See application file for complete search history.

(56) References Cited

U.S. PATENT DOCUMENTS

| | | | | |
|---|---|---|---|---|
| 4,390,320 | A * | 6/1983 | Eiswerth | 416/97 R |
| 6,805,530 | B1 * | 10/2004 | Urban | 415/173.4 |
| 6,851,931 | B1 * | 2/2005 | Tomberg | 416/189 |
| 6,913,445 | B1 * | 7/2005 | Beddard et al. | 416/192 |
| 7,001,144 | B2 * | 2/2006 | Urban et al. | 415/173.1 |
| 7,094,023 | B2 * | 8/2006 | Dube et al. | 415/173.1 |
| 7,094,032 | B2 * | 8/2006 | Seleski | 416/192 |
| 7,273,353 | B2 * | 9/2007 | Dube et al. | 416/192 |
| 7,686,568 | B2 * | 3/2010 | Moors et al. | 415/1 |
| 2005/0036886 | A1 | 2/2005 | Tomberg | |
| 2005/0129519 | A1 | 6/2005 | Beddard | |

* cited by examiner

*Primary Examiner* — Ryan J Walters
(74) *Attorney, Agent, or Firm* — Mark E. Henderson; Ernest G. Cusick; Frank A. Landgraff

(57) ABSTRACT

The present application further describes a method for extending the operating life of a tip shrouded turbine blade that includes the steps of: 1) removing an end located cutter tooth from a seal rail of a tip shroud, the end located cutter tooth including a cutter tooth located at the end of one of the suction side and pressure side of the seal rail of the tip shroud; and 2) attaching a center located cutter tooth to the seal rail of the tip shroud, the center located cutter tooth including a cutter tooth that is located in the approximate center of the seal rail of the tip shroud. In such method, the center located cutter tooth may be attached to the seal rail such that the center located cutter tooth is inside the airfoil if it were projected radially outward from the narrowest point below a tip shroud fillet.

18 Claims, 2 Drawing Sheets

METHOD TO CENTER LOCATE CUTTER TEETH ON SHROUDED TURBINE BLADES

TECHNICAL FIELD

This present application relates generally to methods for center locating cutter teeth on turbine blades. More specifically, but not by way of limitation, the present application relates to methods for replacing cutter teeth positioned on the suction side of the tip shroud with cutter teeth positioned in the center of the tip shroud.

BACKGROUND OF THE INVENTION

A turbine assembly, such as that used in power generation, typically generates rotating shaft power by expanding hot compressed gas produced by combustion of a fuel. Gas turbine buckets or blades generally have an airfoil shape designed to convert the thermal and kinetic energy of the flow path gases into mechanical rotation of the rotor.

The turbine buckets are frequently provided with tip shrouds. The tip shroud prevents failure of the airfoil in high cycle fatigue due to vibratory stresses. Further, a tip shroud seal typically projects radially outwardly from the outermost surface of the shroud, and extends circumferentially between opposite ends of the shroud in the direction of rotation of the turbine rotor. The tip shroud seal conventionally extends radially into a groove formed in a stationary shroud opposing the rotating tip shroud. In some designs, the stationary shroud has a honeycomb pathway. Rather than providing a zero tolerance seal between the tip shroud and the stationary shroud, resulting in instability of the airfoil, it has been found desirable to provide a leakage path over the tip shroud seal which will remove such instability. Typically, a cutter tooth is provided at the leading edge (also referred to as the suction side) of the tip shroud seal so as to cut a wider groove in the honeycomb pathway of the stationary shroud than the width of the tip shroud seal. This enables leakage flow between the high and low pressure regions on opposite sides of the tip shroud seal within the groove. While this results in an undesirable decrease in pressure drop across the airfoil with resulting diminishment of sealing capability, the lost efficiency is compensated by an increase in the stability of the airfoil.

Tip shrouds, however, are subject to creep damage due to the combination of high temperatures and centrifugally induce bending stresses. The failure of a single bucket or blade may cause the entire turbine to be taken offline. In addition to the downtime, such a repair of a bucket is time consuming and/or expensive. There is a desire, therefore, for a turbine blade shroud with improved ability to handle temperature and stress. Such a turbine blade shroud should provide increased lifetime while also increasing the efficiency of the turbine system as whole.

BRIEF DESCRIPTION OF THE INVENTION

The present application thus describes a method for extending the operating life of a tip shrouded turbine blade that includes: 1) removing an end located cutter tooth from a seal rail of a tip shroud; and 2) attaching a center located cutter tooth to the seal rail of the tip shroud. The end located cutter tooth may include a cutter tooth located at the end of one of the suction side and pressure side of the seal rail of the tip shroud. The center located cutter tooth may include a cutter tooth that is located in the approximate center of the seal rail of the tip shroud.

In some embodiments, the removing the end located cutter tooth includes machining the end located cutter tooth until the thickness of the end located cutter tooth is approximately the same as the thickness of the other areas of the seal rail. In some embodiments, the attaching the center located cutter tooth may include welding the center located cutter tooth to the seal rail. In other embodiments, the attaching the center located cutter tooth may include brazing the center located cutter tooth to the seal rail. In other embodiments, the attaching the center located cutter tooth may include building up material by one of welding and brazing.

In some embodiments, the center located cutter tooth may include a generally rectangular shape. Once attached, an outer radial edge of the center located cutter tooth may align with an outer radius of the seal rail. The center located cutter tooth may extend radially inward to the approximate location of the beginning of a seal rail fillet. The radial height of the center located cutter tooth may be approximately half of the radial height of the seal rail. The center located cutter tooth may extend approximately halfway down the height of the seal rail.

In some embodiments, the center located cutter tooth may be attached to the seal rail such that the center located cutter tooth is inside the airfoil if it were projected radially outward from the narrowest point below a tip shroud fillet. In other embodiments, the center located cutter tooth may be attached to the seal rail such that the center located cutter tooth is inside the tip shroud fillet if it were projected radially outward.

The tip shrouded turbine blade may be configured to operate in conjunction with one of a honeycomb shroud and an abradable coating shroud. The tip shrouded turbine blade may be configured to operate in a gas turbine. The tip shrouded turbine blade may be configured to operate in a 9FA+e turbine.

The present application further describes a method for extending the operating life of a tip shrouded turbine blade that includes the steps of: 1) removing an end located cutter tooth from a seal rail of a tip shroud, the end located cutter tooth including a cutter tooth located at the end of one of the suction side and pressure side of the seal rail of the tip shroud; and 2) attaching a center located cutter tooth to the seal rail of the tip shroud, the center located cutter tooth including a cutter tooth that is located in the approximate center of the seal rail of the tip shroud. In such method, the center located cutter tooth may be attached to the seal rail such that the center located cutter tooth is inside the airfoil if it were projected radially outward from the narrowest point below a tip shroud fillet. The attaching the center located cutter tooth may include building up material by one of welding and brazing.

The present application further describes a method for extending the operating life of a tip shrouded turbine blade that includes the steps of: 1) removing an end located cutter tooth from a seal rail of a tip shroud, the end located cutter tooth including a cutter tooth located at the end of one of the suction side and pressure side of the seal rail of the tip shroud; and 2) attaching a center located cutter tooth to the seal rail of the tip shroud, the center located cutter tooth including a cutter tooth that is located in the approximate center of the seal rail of the tip shroud. In such a method, the center located cutter tooth may be attached to the seal rail such that the center located cutter tooth is inside the tip shroud fillet if it were projected radially outward.

These and other features of the present application will become apparent upon review of the following detailed description of the preferred embodiments when taken in conjunction with the drawings and the appended claims.

DETAILED DESCRIPTION OF THE INVENTION

Figure 1:
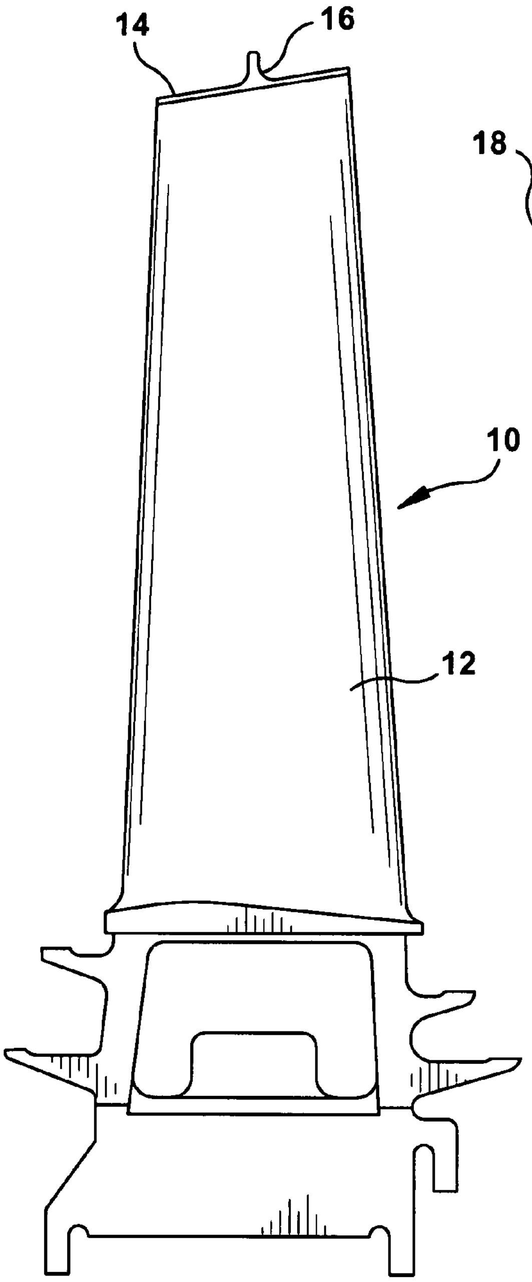
Fig. 1 PRIOR ART
FIG. 1 is a side view of a known turbine blade having a tip shroud.

Referring now to the drawings, in which like numbers refer to like elements throughout the several views, FIG. 1 shows a typical tip shrouded turbine bucket 10. The turbine bucket 10 includes an airfoil 12. The airfoil 12 is the active component that intercepts the flow of gases and acts as a windmill vain to convert the energy of the gases into tangential motion. This motion in turn rotates the rotor to which the buckets 10 are attached.

A tip shroud 14 may be positioned at the top of the airfoil 12. The tip shroud 14 essentially is a flat plate supported towards its center by the airfoil 12. Positioned along the top of the tip shroud 14 may be a seal rail 16. The seal rail 16, as described above, prevents the passage of flow path gases through the gap between the tip shroud 14 and the inner surface of the surrounding components.

Figure 2:
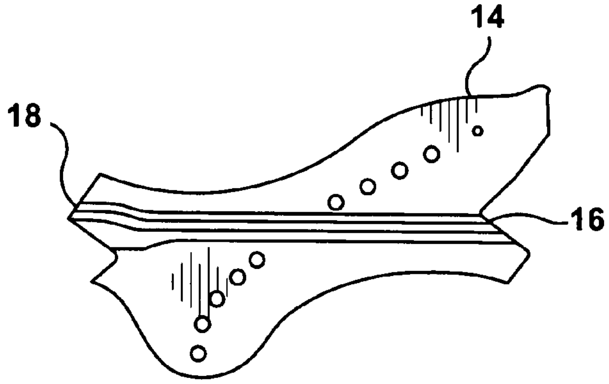
Fig. 2 PRIOR ART
FIG. 2 is a top plan view of a known tip shroud with a cutter tooth on the suction side.

FIG. 2 shows the use of one or more known cutter teeth 18 on the seal rail 16. The cutter tooth 18 is positioned on the leading edge or suction side of the tip shroud 14. As of ordinary skill in the art will appreciate, the use of the cutter teeth 18 may further reduce spillover by clearing a path through the honeycomb or abradable coating of the shroud that may be used for seal stability. As shown in FIG. 2, cutter teeth 18 are generally an area of increased width along the seal rail 16. The use of this suction side position, however, places an inordinate level of stress on the tip shroud 14, particularly under high turbine temperatures.

Figure 3:
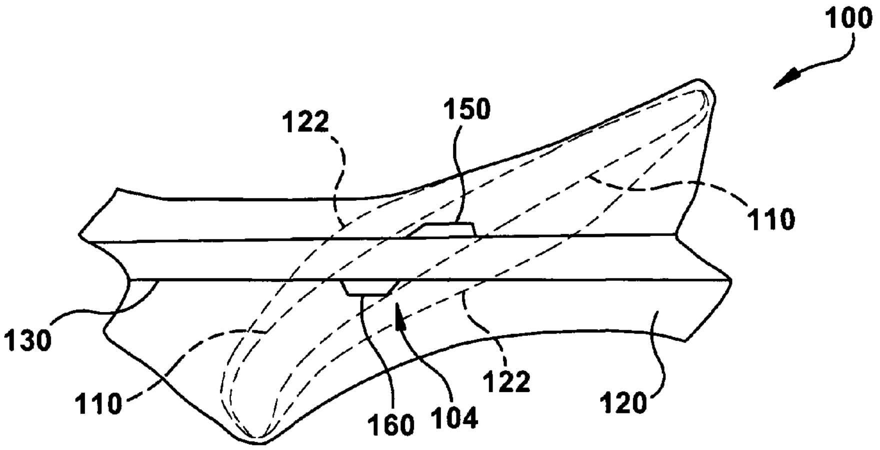
FIG. 3 is a top plan view of a tip shroud having center located cutter teeth.

FIG. 3 shows a turbine bucket 100 with center positioned cutter teeth 104. As above, the turbine bucket 100 includes an airfoil 110 (shown in phantom lines in FIG. 3). The airfoil 110 ends in a tip shroud 120. The transition from the airfoil 110 to the tip shroud 120 may include a tip shroud fillet 122 (also shown in phantom lines in FIG. 3), which constitutes the transition fillet from the airfoil 110 to the tip shroud 120. The tip shroud 120 may be of conventional design. Positioned on top of the tip shroud may be a seal rail 130. The seal rail 130 may extend about the length of the tip shroud 120.

Positioned on the seal rail 130 may be the cutter teeth 104. In this example, the cutter teeth 104 are positioned about the center of the seal rail 130. A first cutter tooth 150 and a second cutter tooth 160 are shown. As illustrated, in some embodiments, the cutter teeth 104 may be positioned about the center of the seal rail 130 such that they are within the phantom lines of the airfoil 110. In other embodiments, the cutter teeth 104 may be positioned about the center of the seal rail 130 such that they are within the phantom lines of the tip shroud fillet 122. As shown, the first tooth 150 and the second tooth 160 may be offset somewhat so as to accommodate the overall shape of the tip shroud 1.20. As one of ordinary skill in the art will appreciate, this center location may extend the life of the turbine bucket 100 by decreasing the stress present in the tip shroud fillet 122 below the tip shroud 120. This location also provides a more symmetrical design to the tip shroud 120 as a whole.

Figure 4:
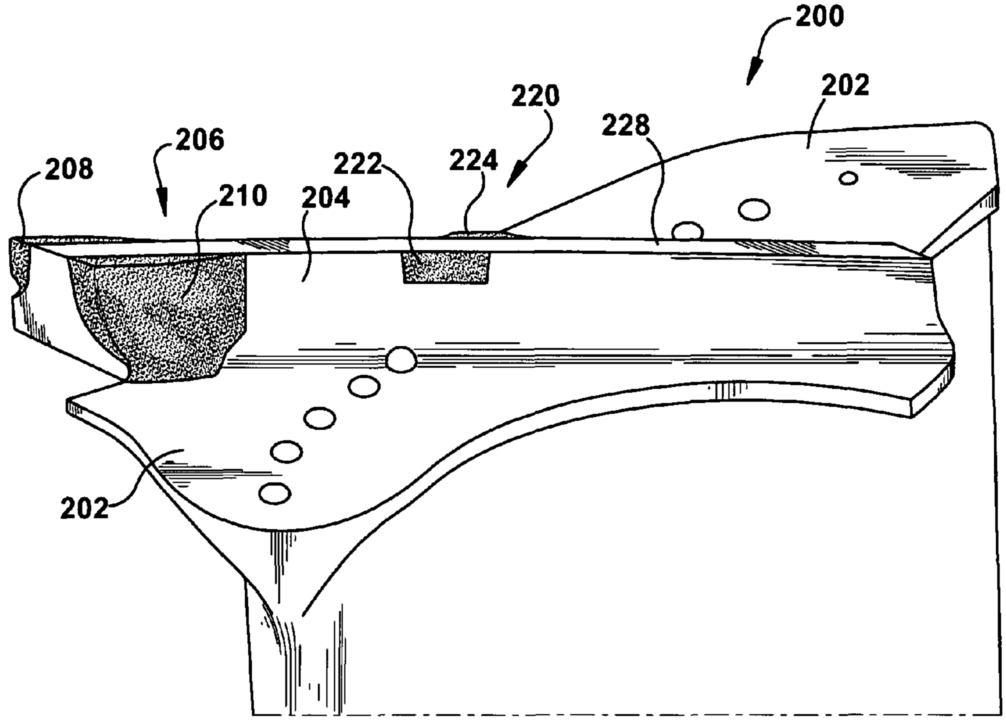
FIG. 4 is a perspective view of a turbine blade with tip shroud demonstrating the replacement of suction side cutter teeth with center located cutter teeth consistent with exemplary embodiments of the present invention.

FIG. 4 is a perspective view of a turbine blade with tip shroud demonstrating the replacement of leading edge or suction side cutter teeth with center located cutter teeth consistent with exemplary embodiments of the present invention. It will be appreciated that there are a large number of airfoils in use that have cutter teeth located on the suction side or end of the seal rail of the tip shroud. The overhung mass of such cutter teeth creates an inordinate level of stress in the tip shroud fillet, which limits the life of the component. An example of such a turbine blade is the blade used in the second stage of the "9FA+e turbine" sold by the General Electric Company of Schenectady, N.Y. Generally, such blades are replaced after a certain amount of usage due to the high possibility of failure in the tip shroud fillet. It is proposed by the current invention that the useful lives of such turbine blades may be significantly extended if the cutter teeth at the end of the seal rail are removed and replaced with center located cutter teeth.

Thus, as shown in FIG. 4, a turbine blade 200 may include a tip shroud 202 with a seal rail 204. Darkened areas at the suction side or end of the seal rail 204 may represent end located cutter teeth 206, which may include a first end located cutter tooth 208 and a second end located cutter tooth 210. As used herein, the term "end located cutter teeth" is defined to include any cutter teeth located at the suction side or pressure side of the seal rail of a tip shroud. Consistent with embodiments of the present invention, the end located cutter teeth 206 may be removed. The removal process may be accomplished via a conventional machining process or other processes. Specifically, the cutter teeth 206 may be machined until the thickness of the seal rail 204 at the end or suction side is approximately consistent with that of the middle and or pressure side of the seal rail 204.

With the cutter teeth 206 removed, one or more center located cutter teeth 220, which may include a first center located cutter tooth 222 and a second center located cutter tooth 224, may be attached to the seal rail 204. As used herein, the term "center located cutter teeth" is defined to include cutter teeth that are located in the approximate center of the seal rail. The center located cutter teeth 220 may be attached pursuant to conventional processes, including welding or brazing. As used herein, attaching via welding includes both welding a piece to the seal rail and creating a center tooth with weld buildup. As used herein, attaching via brazing includes both brazing a piece to the seal rail and creating a center tooth with brazing buildup. In some embodiments, the shape of the center located cutter teeth 220 may be rectangular when viewed axially from either the front or rear of the component, though those of ordinary skill in the art will appreciate that other shapes are possible. Once installed on the seal rail 204, the outer radial edge of the center located cutter teeth 220 may align with the outer radius of the seal rail. From there the center located cutter teeth 220 may extend radially inward to the approximate location of the beginning of the seal rail fillet 228, which constitutes the transition fillet between the seal rail 204 and the tip shroud 202. In general, this means the center located cutter tooth 220 extends approximately halfway down the height of the seal rail 204, as shown in FIG. 4.

As previously described, the center located cutter teeth 220 may be positioned along the seal rail 204 such that they are inside the airfoil if it were projected radially outward from the narrowest point below the tip shroud fillet (see FIG. 3). In other embodiments, the center located cutter teeth 220 may be positioned about the center of the seal rail 130 such that they are within the tip shroud fillet if it were projected radially outward (see FIG. 3). As shown in FIG. 4, the first center located cutter tooth 222 and the second center located cutter tooth 224 may be offset somewhat so as to accommodate the overall shape of the tip shroud 202. The axial thickness of the center located cutter teeth 220 should be approximately the same as or slightly less than that of the end located cutter teeth 206.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A method for extending the operating life of a tip shrouded turbine blade, the method comprising the steps of:

removing an end located cutter tooth from a seal rail of a tip shroud; and attaching a center located cutter tooth to the seal rail of the tip shroud;

wherein the center located cutter tooth is smaller than the end located cutter tooth wherein the center located cutter tooth comprises a radial height that is less than a radial height of the end located cutter tooth; and wherein the center located cutter tooth comprises an axial thickness that is less than an axial thickness of the end located cutter tooth.

2. The method of claim 1, wherein the end located cutter tooth comprises a cutter tooth located at the end of one of the suction side and pressure side of the seal rail of the tip shroud.

3. The method of claim 1, wherein the center located cutter tooth comprises a cutter tooth that is located in the approximate center of the seal rail of the tip shroud.

4. The method of claim 1, wherein the removing the end located cutter tooth comprises machining the end located cutter tooth until the thickness of the end located cutter tooth is approximately the same as the thickness of a narrower section of the seal rail, the narrow section comprising a section that does not include a cutter tooth.

5. The method of claim 1, wherein the attaching the center located cutter tooth comprises welding the center located cutter tooth to the seal rail.

6. The method of claim 1, wherein the attaching the center located cutter tooth comprises brazing the center located cutter tooth to the seal rail.

7. The method of claim 1, wherein the attaching the center located cutter tooth comprises building up material by one of welding and brazing.

8. The method of claim 1, wherein the center located cutter tooth comprises a generally rectangular shape.

9. The method of claim 8, wherein, once attached, an outer radial edge of the center located cutter tooth resides in proximity to an outer radial edge of the seal rail.

10. The method of claim 1, wherein the radial height of the center located cutter tooth is less than half of a radial height of the seal rail; and wherein the radial height of the end located cutter tooth is greater than half of the radial height of the seal rail.

11. The method of claim 1, wherein the center located cutter tooth of the tip shrouded turbine blade is configured to operate in conjunction with one of a honeycomb shroud and an abradable coating shroud; and wherein the center located cutter tooth comprises a circumferential thickness that is less than a circumferential thickness of the end located cutter tooth.

12. The method of claim 11, wherein the tip shrouded turbine blade is configured to operate in a gas turbine;

wherein the tip shrouded turbine blade comprises an airfoil, the airfoil comprising a narrow point just inboard of the inboard end of a tip shroud fillet; and wherein the center located cutter tooth is attached to the seal rail such that the center located cutter tooth is inside a radially projected profile of the airfoil at the narrow point.

13. The method of claim 12, wherein the tip shrouded turbine blade is configured to operate in a 9FA+e turbine.

14. A method for extending the operating life of a tip shrouded turbine blade, the method comprising the steps of:

removing an end located cutter tooth from a seal rail of a tip shroud, the end located cutter tooth comprising a cutter tooth located at the end of one of the suction side and pressure side of the seal rail of the tip shroud;

attaching a center located cutter tooth to the seal rail of the tip shroud, the center located cutter tooth comprising a cutter tooth that is located in the approximate center of the seal rail of the tip shroud; and using the center located cutter tooth to cut a groove in a stationary shroud;

wherein the center located cutter tooth is smaller than the end located cutter tooth wherein the step of removing the end located cutter tooth from the seal rail comprises removing a first end located cutter tooth on an upstream side of the seal rail and a second end located cutter tooth on a downstream side of the seal rail;

wherein the step of attaching the center located cutter tooth comprises attaching a first center located cutter tooth to the upstream side of the seal rail and attaching a second center located cutter tooth to the downstream side of the seal rail; and wherein the center located cutter tooth being smaller than the end located cutter tooth comprises:

the first and second center located cutter teeth having a combined axial thickness that is less than a combined axial thickness of the first and second end located cutter teeth; and the first center located cutter tooth having a radial height that is less than a radial height of the first end located cutter tooth; and the second center located cutter tooth having a radial height that is less than a radial height of the second center located cutter tooth.

15. The method of claim 14, wherein the first center located cutter tooth and the second center located cutter tooth comprise a circumferentially offset configuration.

16. The method of claim 15, wherein the tip shrouded turbine blade comprises an airfoil; and wherein the circumferentially offset configuration comprises the first center located cutter tooth and second center located cutter tooth each residing approximately within a radially projected profile of the airfoil.

17. The method of claim 16, wherein the tip shrouded turbine blade comprises an airfoil; and wherein the circumferentially offset configuration comprises one in which the first center located cutter tooth resides closer to a leading edge of the tip shroud than the second center located cutter tooth such that each of the center located cutter teeth resides over a radially projected profile of the airfoil.

18. The method of claim 17, wherein the tip shrouded turbine blade comprises an airfoil, the airfoil including a narrow point just inboard of an inboard end of a tip shroud fillet; and wherein the first center located cutter tooth and the second center located cutter tooth are positioned on the seal rail such that each maintains a position within a radially projected profile of the airfoil at the narrow point.

* * * * *